United States Patent
Biswas et al.

(10) Patent No.: US 10,401,183 B2
(45) Date of Patent: Sep. 3, 2019

(54) LOCATION PRIVACY

(71) Applicant: Nokia Technologies Oy, Espoo (FI)

(72) Inventors: Debmalya Biswas, Lausanne (CH); Matthew John Lawrenson, Lausanne (CH); Julian Nolan, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/557,230

(22) PCT Filed: Mar. 16, 2015

(86) PCT No.: PCT/FI2015/050174
§ 371 (c)(1),
(2) Date: Sep. 11, 2017

(87) PCT Pub. No.: WO2016/146879
PCT Pub. Date: Sep. 22, 2016

(65) Prior Publication Data
US 2018/0052001 A1 Feb. 22, 2018

(51) Int. Cl.
*G01C 21/34* (2006.01)
*H04W 4/029* (2018.01)
*H04W 8/16* (2009.01)
*G06F 21/62* (2013.01)
*H04W 12/02* (2009.01)

(52) U.S. Cl.
CPC ..... *G01C 21/3484* (2013.01); *G06F 21/6245* (2013.01); *H04W 4/029* (2018.02); *H04W 8/16* (2013.01); *H04W 12/02* (2013.01)

(58) Field of Classification Search
CPC ........... G01C 21/3484; G06F 21/6245; H04W 4/029; H04W 12/02; H04W 8/16
See application file for complete search history.

(56) References Cited

U.S. PATENT DOCUMENTS

| 6,975,940 B1 | 12/2005 | Childs et al. |
| 8,630,897 B1 | 1/2014 | Gomez et al. |
| 2003/0036844 A1 | 2/2003 | Balasuriya |

(Continued)

FOREIGN PATENT DOCUMENTS

| GB | 2397683 A | 7/2004 |
| JP | 2002-197152 A | 7/2002 |

(Continued)

OTHER PUBLICATIONS

Litman, "Autonomous Vehicle Implementation Predictions Implications for Transport Planning", Victoria Transport Policy Institute, Jun. 4, 2014, pp. 1-20.

(Continued)

*Primary Examiner* — Yazan A Soofi
(74) *Attorney, Agent, or Firm* — Seppo Laine Oy

(57) ABSTRACT

According to an example aspect of the present invention, there is provided an apparatus comprising at least one receiver configured to receive a route indication specifying an initial point (110) and an end point of a route (120), and at least one processing core configured to determine a plurality of candidate routes (112, 114) based at least in part on the route indication and a privacy preference indication, and to determine for each of the plurality of candidate routes a privacy overhead route (112P, 114P).

19 Claims, 6 Drawing Sheets

(56) References Cited

U.S. PATENT DOCUMENTS

| | | | |
|---|---|---|---|
| 2004/0246147 A1* | 12/2004 | von Grabe | G01C 21/3492 340/995.13 |
| 2008/0091342 A1* | 4/2008 | Assael | G01C 21/3438 701/533 |
| 2009/0157583 A1 | 6/2009 | Couckuyt et al. | |
| 2013/0298248 A1* | 11/2013 | Boldrev | G06F 21/6245 726/26 |
| 2014/0136414 A1 | 5/2014 | Abhyanker | |
| 2014/0180914 A1* | 6/2014 | Abhyanker | G01C 1/00 705/39 |
| 2015/0199619 A1 | 7/2015 | Ichinose et al. | |

FOREIGN PATENT DOCUMENTS

| | | |
|---|---|---|
| JP | 2003-214879 A | 7/2003 |
| JP | 2006-153463 A | 6/2006 |
| JP | 2008-209345 A | 9/2008 |
| JP | 2014-126486 A | 7/2014 |
| WO | 2009/158211 A2 | 12/2009 |
| WO | 2014/024254 A1 | 2/2014 |
| WO | 2014/103399 A1 | 7/2014 |
| WO | 2015/032975 A1 | 3/2015 |
| WO | 2016/142571 A1 | 9/2016 |
| WO | 2016/146880 A1 | 9/2016 |

OTHER PUBLICATIONS

"Driverless Cars—The Future of Transport in Cities", The Guardian, Retrieved on Sep. 1, 2017, Webpage available at : http://www.theguardian.com/sustainable-business/driverless-vehicles-future-car-sharing.

Glancy, "Privacy in Autonomous Vehicles", Research Paper, vol. 52, No. 4, Dec. 14, 2012, 70 pages.

"Autonomous Cars Could Actually Make Car Sharing Work", Jalopnik, Retrieved on Sep. 1, 2017, Webpage available at : http://jalopnik.com/autonomous-cars-could-actually-make-car-sharing-work-1548927188.

"Imagine: A World Where Nobody Owns Their Own Car", Citylab, Retrieved on Sep. 1, 2017, Webpage available at : https://www.citylab.com/transportation/2014/02/imagine-world-where-nobody-owns-their-own-car/8387/.

"Smartphone Users Value Their Privacy and Are Willing to Pay for It, CU-Boulder Economists Find", CU Boulder Today/University of Colorado Boulder, Retrieved on Sep. 1, 2017, Webpage available at : http://www.colorado.edu/today/2013/12/10/smartphone-users-value-their-privacy-and-are-willing-pay-it-cu-boulder-economists-find.

"Privacy as a Premium: Why It's Time to Say Goodbye to the Free Internet", The Next Web, Retrieved on Sep. 1, 2017, Webpage available at : https://thenextweb.com/socialmedia/2014/08/02/privacy-premium-time-say-goodbye-free-internet/.

Biswas et al., "Privacy-Preserving Outsourced Profiling", IEEE 12th Conference on Commerce and Enterprise Computing, Nov. 10-12, 2010, pp. 136-143.

International Search Report and Written Opinion received for corresponding Patent Cooperation Treaty Application No. PCT/FI2015/050174, dated Sep. 30, 2015, 22 pages.

Decker, "Location Privacy—An Overview", 7th International Conference on Mobile Business, Jul. 7-8, 2008, pp. 221-230.

Office action received for corresponding Japanese Patent Application No. 2017-548935, dated Sep. 25, 2018, 2 pages of office action and 2 pages of translation available.

* cited by examiner

LOCATION PRIVACY

RELATED APPLICATION

This application was originally filed as PCT Application No. PCT/FI2015/050174 filed Mar. 16, 2015.

FIELD OF INVENTION

The present invention relates to securing the confidentiality of user location, such as for example in the context of shared self-driving cars.

BACKGROUND OF INVENTION

Driverless cars are being tested and developed, which opens the possibility to their widespread use in the future. A driverless car, also known as an autonomous car, self-driving car or robotic car, is a vehicle capable of fulfilling the main transportation capabilities of a traditional car. A driverless car may be enabled to sense, at least in part, its surroundings without human input and to navigate in accordance with traffic regulations and the surrounding environment.

A driverless car may be configured to perform like a taxi without a driver, in that a passenger may provide the car with a destination address, responsive to which the car may plan a route to the destination address and drive itself there, with the passenger inside. The passenger may pay for the ride with a credit card, for example, or the passenger may have a membership in a driverless car sharing arrangement, in which case the passenger may pay a monthly fee, for example.

Customer data may be classified as private, and the movements of a driverless car may disclose the movements of passengers therein. In particular if an individual passenger can be associated with a specific ride, the endpoints of the ride could disclose private information relating to the passenger.

In traditional taxis, a human driver handles the endpoints of the ride, in particular the driver may drive to the destination address without recording the destination address in any digital system. In contrast, since a driverless car may depend on a digital system to implement navigation to the destination address, there is a risk that the digital system, by design or by accident, records the destination addresses. In case the destination addresses are recorded, they may become associated with the passenger, for example via credit card details used to pay for the ride.

Likewise an initial point of the ride may become recorded in a digital system, in case the passenger orders the driverless car to collect himself or herself from the initial point. As the driverless car may plan the route to the destination starting from the initial point, the whereabouts of the passenger also at the start of the journey may become compromised.

SUMMARY OF THE INVENTION

The invention is defined by the features of the independent claims. Some specific embodiments are defined in the dependent claims.

According to a first aspect of the present invention, there is provided an apparatus comprising at least one receiver configured to receive a route indication specifying an initial point and an end point of a route, and at least one processing core configured to determine a plurality of candidate routes based at least in part on the route indication and a privacy preference indication, and to determine for each of the plurality of candidate routes a privacy overhead route.

Various embodiments of the first aspect may comprise at least one feature from the following bulleted list:
  the at least one processing core is further configured to determine, for each privacy overhead route, at least one of an associated time overhead and an associated fuel consumption overhead
  the at least one processing core is configured to determine the plurality of candidate routes by employing a graph traversal algorithm to identify routes that begin in the initial point specified in the route indication and satisfy the privacy preference indication
  the privacy preference indication is associated with a minimum number of possible paths
  the plurality of candidate routes comprises at least one first route that comprises the end point specified in the route indication such that the first route does not end at the end point
  for each of the at least one first route, a route extending from the end point to the end of the first route comprises the privacy overhead route
  the plurality of candidate routes comprises at least one second route that does not comprise the end point
  for each of the at least one second route, a route extending from the end of the second route to the end point comprises the privacy overhead route
  the at least one processing core is configured to determine the plurality of candidate routes at least in part in dependence of a maximum time parameter.

According to a second aspect of the present invention, there is provided a method comprising receiving a route indication specifying an initial point and an end point of a route, and determining a plurality of candidate routes based at least in part on the route indication and a privacy preference indication, and determining for each of the plurality of candidate routes a privacy overhead route.

Various embodiments of the second aspect may comprise at least one feature corresponding to a feature from the preceding bulleted list laid out in connection with the first aspect.

According to a third aspect of the present invention, there is provided an apparatus, comprising a memory interface configured to access encryption keys stored in a memory, and at least one processing core configured to determine a preferred route comprising a sequence of node identifiers, to encrypt each of the node identifiers using a private key of the apparatus which is comprised in the encryption keys to obtain a sequence of encrypted node identifiers, to receive a second sequence of encrypted node identifiers, and to perform a secure comparison between the sequence of node identifiers and the second sequence of encrypted node identifiers.

Various embodiments of the third aspect may comprise at least one feature from the following bulleted list:
  the at least one processing core is further configured to cause transmission of shared node identifiers among the sequence of node identifiers and the second sequence of encrypted node identifiers
  the at least one processing core is further configured to receive a public key associated with the second sequence of encrypted node identifiers and to perform the secure comparison based at least in part on the received public key
  the at least one processing core is further configured to determine, based at least in part on the secure comparison, at least one of the following: a length of a first route segment that is shared between the preferred route and a route defined by the second sequence of encrypted node identifiers, a length of a second route segment that is not shared between the preferred route and the route defined by the second sequence of encrypted node identifiers, and a sequence in which users enter and leave a vehicle that moves along a compound route based on the preferred route and the route defined by the second sequence of encrypted node identifiers the at least one processing core is further configured to cause transmission of the sequence of encrypted node identifiers.

According to a fourth aspect of the present invention, there is provided a method, comprising determining a preferred route comprising a sequence of node identifiers, encrypting each of the node identifiers using a private key of an apparatus to obtain a sequence of encrypted node identifiers, providing the sequence of encrypted node identifiers to a network node, receiving a second sequence of encrypted node identifiers, and performing a secure comparison between the sequence of node identifiers and the second sequence of encrypted node identifiers.

Various embodiments of the fourth aspect may comprise at least one feature corresponding to a feature from the preceding bulleted list laid out in connection with the third aspect.

According to a fifth aspect of the present invention, there is provided an apparatus comprising means for receiving a route indication specifying an initial point and an end point of a route, means for determining a plurality of candidate routes based at least in part on the route indication and a privacy preference indication, and means for determining for each of the plurality of candidate routes a privacy overhead route.

According to a sixth aspect of the present invention, there is provided an apparatus, comprising means for determining a preferred route comprising a sequence of node identifiers, means for encrypting each of the node identifiers using a private key of the apparatus to obtain a sequence of encrypted node identifiers, means for providing the sequence of encrypted node identifiers to a network node, means for receiving a second sequence of encrypted node identifiers, and means for performing a secure comparison between the sequence of node identifiers and the second sequence of encrypted node identifiers.

According to a seventh aspect of the present invention, there is provided a non-transitory computer readable medium having stored thereon a set of computer readable instructions that, when executed by at least one processor, cause an apparatus to at least receive a route indication specifying an initial point and an end point of a route, determine a plurality of candidate routes based at least in part on the route indication and a privacy preference indication, and determine for each of the plurality of candidate routes a privacy overhead route.

According to an eighth aspect of the present invention, there is provided a non-transitory computer readable medium having stored thereon a set of computer readable instructions that, when executed by at least one processor, cause an apparatus to at least determine a preferred route comprising a sequence of node identifiers, encrypt each of the node identifiers using a private key of the apparatus to obtain a sequence of encrypted node identifiers, provide the sequence of encrypted node identifiers to a network node, receive a second sequence of encrypted node identifiers, and perform a secure comparison between the sequence of node identifiers and the second sequence of encrypted node identifiers.

According to a ninth aspect of the present invention, there is provided computer program configured to cause a method in accordance with the second or fourth aspect to be performed.

INDUSTRIAL APPLICABILITY

At least some embodiments find industrial application in securing user privacy, such as for example location privacy.

DETAILED DESCRIPTION OF EXAMPLE EMBODIMENTS

By associating a privacy overhead route with a route taken by a driverless car, location privacy of passengers may be improved. Effects of the privacy overhead route may be quantified to enable trade-offs between privacy and time, and/or privacy and fuel consumption or price. Where a driverless car is shared between at least two passengers simultaneously, privacy preferences of the passengers may be taken into account in designing the route the car is to take. For example, a passenger with the highest privacy preference may be dropped off last, so the other passengers will not see her destination.

Figure 1:
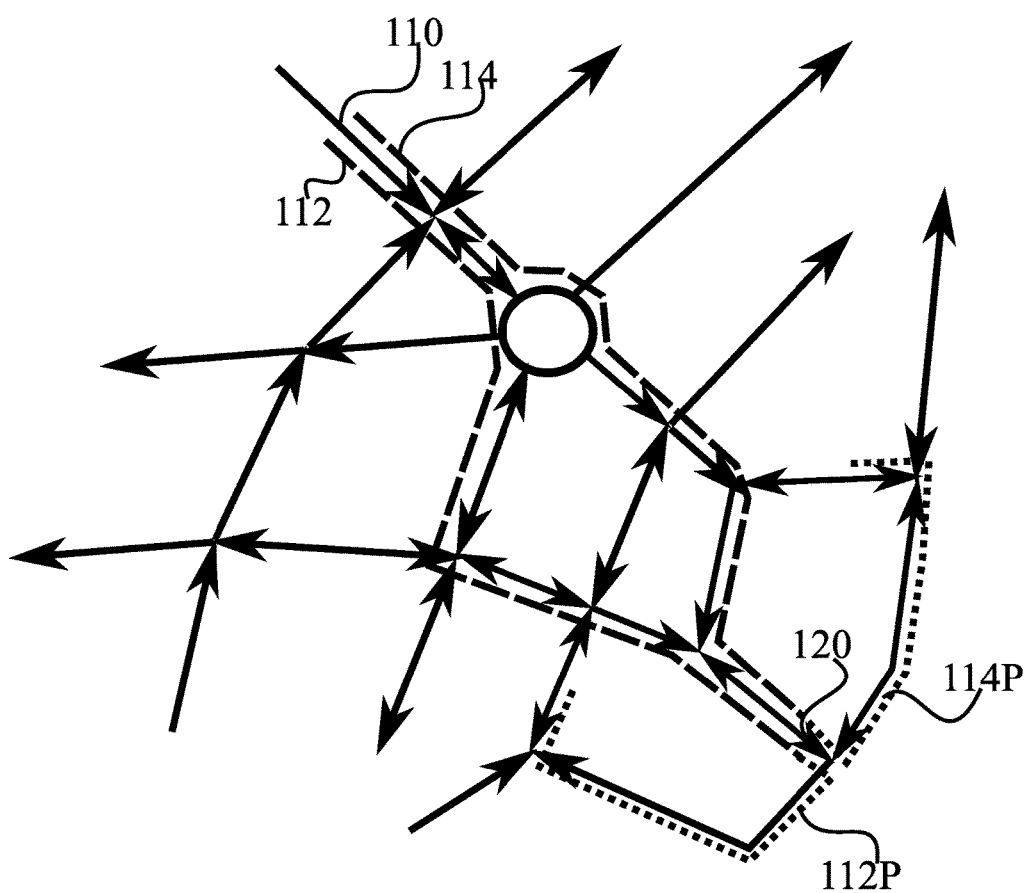
FIG. 1 illustrates an example map illustrating routes in accordance with at least some embodiments of the present invention.

FIG. 1 illustrates an example map illustrating routes in accordance with at least some embodiments of the present invention. The underlying map is drawn with solid lines. Intersecting solid lines indicate road intersections. The map comprises one roundabout, from which five roads depart. The map may correspond to a part of a city, for example. While the illustrated map is rather simple to facilitate explaining features of the present invention, it is to be understood that embodiments of the invention may equally be applied to more complex maps with a larger number of roads, intersections, roundabouts and/or other features. For example, in some maps a subset of roads may be one-way, enabling cars to travel along them in one direction but not the opposite direction.

The map of FIG. 1 is marked with an initial point 110 and end point 120. Initial point 110 and end point 120 may be provided by a user to a driverless car management program, for example. Such a management program may be arranged to run in a computer of a driverless car, or in a computer of the passenger, such as, for example, a smartphone or tablet computer of the passenger. Where the driverless car is owned by a fleet operator or another party, the initial and end points may be provided to the management program as part of a route indication, the route indication optionally also comprising further route information. Examples of further route information the route indication may comprise include a privacy preference indicator, a desired maximum time parameter, and a privacy impact threshold. The privacy preference indicator may provide an indication as to how highly the user prefers to keep his location private. The desired maximum time parameter may provide a maximal time that is available for the ride, that is, any route that the driverless car selects should be estimated to last less time than indicated by the desired maximum time parameter. The privacy impact threshold may indicate, in terms of at least one of time, fuel consumption and cost, a maximum acceptable overhead incurred by implementing the privacy preference indicated by the privacy preference indicator.

The privacy preference indicator may comprise a route uncertainty indication, or the route uncertainty indication may be obtained from the privacy preference indicator by applying a mapping. In generic terms, a route uncertainty indication may indicate a number of roads outgoing from intersections and/or roundabouts that are comprised in the route in addition to the roads that are traversed as part of a route. Therefore, for example, where a simple route proceeds from an initial point to an end point via exactly one intersection with four outgoing roads, the route uncertainty associated with this route is 4. Route uncertainty will be explained in more detail in connection with FIG. 2A and FIG. 2B.

As a response to initial point 110 and end point 120, the driverless car management program may determine candidate routes, such as for example route 112 and route 114. Route 112 comprises a privacy overhead route 112P. Route 114 comprises a privacy overhead route 114P. Routes 112 and 114 both satisfy the privacy preference indicator, which implies that route 112 and route 114 both have higher route uncertainty than the route uncertainty indicator associated with the privacy preference indicator. In the illustrated example, both route 112 and route 114 traverse end point 120. Other candidate routes do not necessarily traverse end point 120, for example, a candidate route may end a few blocks from end point 120. In this case, the passenger may walk or otherwise cover the remaining distance, with this remaining distance being in this case considered a privacy overhead route.

The privacy overhead routes serve to conceal end point 120. For example, the driverless car may drop off the passenger at end point 120, and then drive the rest of the route, namely the privacy overhead route, before beginning to transmit its location once more. This way, the driverless car will emerge in a dispatching system, reservation application or other management system a certain distance from end point 120. If the privacy overhead route ends in an area with a large number of intersections, the location of end point 120 can be concealed with a shorter privacy overhead route.

Figure 2A:
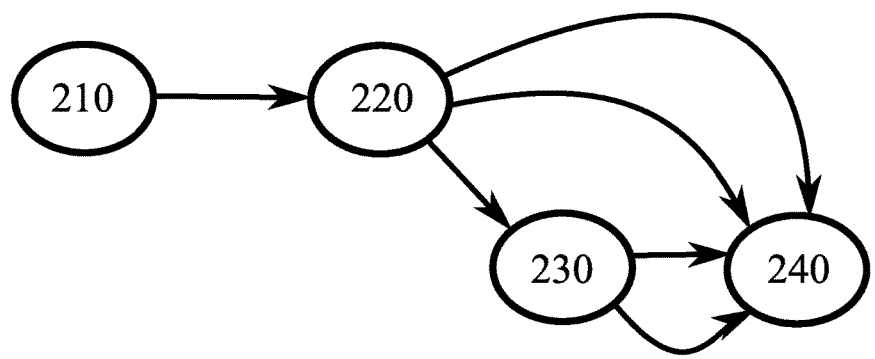
FIG. 2A illustrates routes that exhibit route uncertainty.

FIG. 2A illustrates routes that exhibit route uncertainty. An initial point 210 and end point 240 are joined via intersections 220 and 230. Intersection 220 has three outgoing roads and intersection 230 has two outgoing roads. Therefore, the route {210, 220, 230, 240} altogether has a route uncertainty of 3+(2−1)=4. One is subtracted since a further node, 230, is encountered along one of the roads outgoing from node 220. It may be considered, that there are in this case four alternative routes from 210 to 240. The alternative routes are illustrated in FIG. 2A by arrows. It should be understood, that route uncertainty may be defined in other ways as well, and the present invention is not limited to the definition of route uncertainty herein explained. Rather, other ways of defining route uncertainty can equally be used when determining candidate routes in such a way that they fulfil the route uncertainty condition.

Figure 2B:
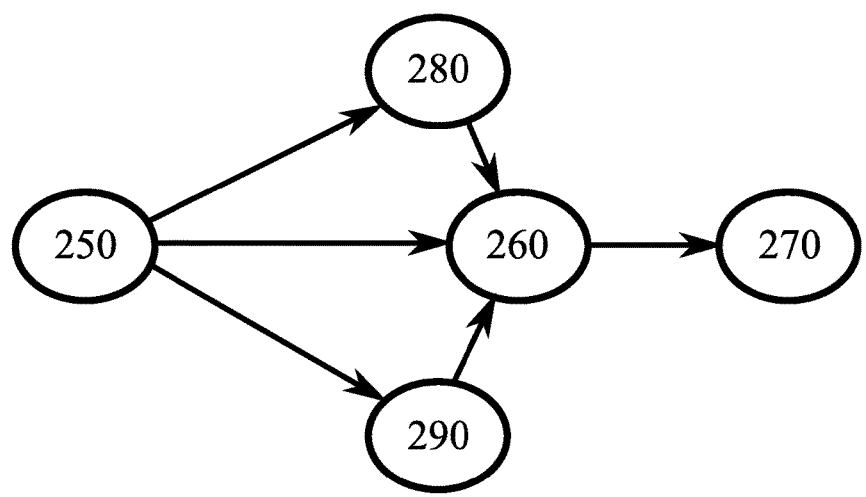
FIG. 2B illustrates routes in accordance with at least some embodiments of the present invention.

FIG. 2B illustrates routes in accordance with at least some embodiments of the present invention. In FIG. 2B, the initial point is 250 and the end point is 260. In the system of FIG. 2B, the driverless car management program determines three candidate routes that satisfy the privacy preference indication: route {250, 280, 260, 270}, route {250, 260, 270} and route {250, 290, 260, 270}. In each of these routes, the section {260, 270} is a privacy overhead route.

In determining the candidate routes, the underlying map may be considered to be an undirected graph which may be traversed by a graph traversal algorithm, such as for example the Depth-first search algorithm. In the graph, edges may correspond to roads and nodes may correspond to beginnings and ends of roads. The nodes may also correspond to intersections and roundabouts of the map. The set of candidate routes may correspond to an output of the graph traversal which is further filtered with the route uncertainty criterion associated with the privacy preference indication.

Once candidate routes are identified, privacy overheads may be estimated. For each candidate route, there may be determined an associated privacy overhead. The privacy overhead may reflect additional effort beyond merely conveying the passenger from the initial point to the end point. There may be identified two cases, firstly where the end point is traversed by the candidate route and secondly the case where the end point is not traversed by the candidate route. In the first case, the privacy overhead is associated with the privacy overhead route, namely, the section of the route the driverless car travels empty after dropping off the passenger in the end point. In the second case, the privacy overhead is incurred from travelling from the end of the route to the end point. Overhead may be incurred also from a section of a candidate route other than the privacy overhead route, as the section of the candidate route before the privacy overhead route is not necessarily the fastest or shortest route.

A temporal overhead, that is, an overhead with respect to elapsed time, represents a length of time that elapses over and above a length of time that necessarily elapses when travelling in a driverless car from the initial point to the end point. For example, firstly the fastest route may be estimated between the initial point and the end point, for example based on prevailing traffic conditions and/or expected travel times along roads comprised in the fastest route. Thus speed limits may be taken into account, for example. Once the time needed to cover the fastest route has been established, it may be subtracted from a travel time associated with each candidate route to obtain the temporal overhead. The travel time associated with a candidate route may comprise a length of time it takes for a driverless car to drive the candidate route from start to end, including the privacy overhead part of the route. For candidate routes that do not traverse the end point, the travel time associated with these candidate routes includes the time it takes for the passenger to travel from the start of the candidate route to the end of the candidate route.

A fuel consumption overhead for a candidate route may be obtained by comparing a fuel consumption associated with the candidate route with a fuel consumption of a shortest-path route. Where the candidate route comprises a privacy overhead route, the fuel consumption overhead is foreseen to be positive, that is, fuel consumption is expected to be higher than when using the shortest-path route. On the other hand, where the candidate route does not traverse the end point, it may occur that the candidate route is shorter than the shortest-path route since these candidate routes do not connect the initial point with the end point. As such, the fuel consumption overhead may be negative as fuel may in fact be saved as opposed to the case where the shortest-path route is selected. In some cases, a fare is applied to the passenger that may be proportional to the distance covered and/or the fuel consumed, in which cases the fuel consumption overhead implies a cost overhead.

Once overheads are determined, one of the candidate routes may be selected. The selection may be based on predefined criteria, such as maximum time parameter, optimizing fuel consumption and/or minimizing time while respecting the privacy preference indicator. In some embodiments, a subset of routes may be presented to the user for final selection. For example, the subset may comprise three of the most advantageous routes. Once selection is done, the driverless car can drive the passenger along the selected route.

In case more than one passenger is in the driverless car, the driverless car management program may enable the passengers to securely compare routes. For example, each passenger may compile a preferred route, such as for example using a process as described above, or simply selecting the shortest route. Each passenger may also apply a privacy preference indicator. For the sake of simplicity, in the following the process is described for the case of two passengers.

In a first phase, both passengers compile their preferred routes, each preferred route consisting of sequence of node identifiers: $\{s_1, s_2, \ldots, s_n\}_A$ for passenger A and $\{s_1, s_2, \ldots, s_n\}_B$ for passenger B. It is assumed both routes have n nodes, but in general they of course can be of differing lengths.

In a second phase, both passengers encrypt their preferred routes. In some embodiments, the first and last nodes, namely the initial and end points, may be omitted from encryption. Both A and B may encrypt the intermediate nodes of their preferred routes with their respective private keys, wherein corresponding public keys may be publicly or otherwise available to the driverless car dispatching system and/or other potential passengers. The users may submit the encrypted routes to the dispatching system: $\{E(s_2), \ldots, E(s_{n-1})\}_A$ and $\{E(s_2), \ldots, E(s_{n-1})\}_B$, for example. The encrypted routes may be provided in the form of sequences of encrypted node identifiers, for example.

The dispatching system shares the encrypted routes by providing the encrypted route of passenger A to passenger B, and vice versa. Alternatively, passenger A and passenger B may exchange the encrypted routes via a mobile application, for example, without involving the dispatcher.

In a third phase, once in possession of each other's routes, the passengers may securely compare the nodes comprised in the routes. A secure comparison may be performed as described in the publication "Privacy-Preserving Outsourced Profiling", by D. Biswas, S. Haller and F. Kerschbaum, $7^{th}$ IEEE International Conference on E-Commerce Technology CEC'05 2010, pp. 136-143, doi:10.1109/CEC.2010.39. The secure comparison may be based on an encrypted node, a non-encrypted node and a public key corresponding to the private key used to encrypt the encrypted node. To perform the comparison, the passengers may derive a comparison token for each node comprised in their respective own preferred routes, and compare the comparison tokens with the encrypted nodes of the other passenger. Each comparison token may be derived using an unencrypted node of the comparing passenger and a public key of the other passenger. The secure comparison may return a "yes" when the encrypted and non-encrypted nodes are the same node and a "no" when they are not.

In a fourth phase, a shared route may be extracted which is composed of shared nodes in the preferred routes of passenger A and passenger B. Based on knowledge of the shared route, at least one of the following may be determined: a distance of the shared portions of the route, a distance during which each of the users will be travelling alone in the vehicle, and a sequence in which the users will be picked up and dropped off. A passenger may be travelling alone in the driverless car either at the start before other passengers are picked up, after the last co-passenger has been dropped off at the end, or along the way when other co-passengers have been dropped off before a further co-passenger is picked up.

A requested level of privacy may be provided to passengers based on a route uncertainty relating to segments of the route when the passenger in question is travelling alone in the driverless car. Where appropriate, the sequence in which passengers are dropped off may be selected based on privacy requirements—for example, when two passengers are to be driven to the same area or suburb, the driverless car may first drop off the passenger requesting less privacy, since this way no passenger remains in the driverless car when the other passenger is dropped off, and this no-one sees where this drop-off occurs.

Figure 3:
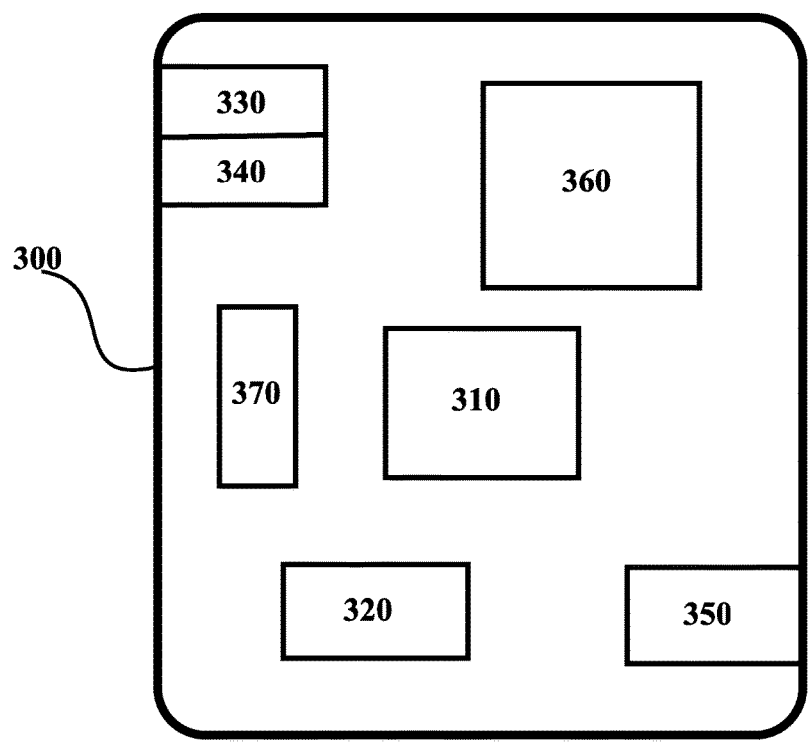
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing device of a passenger, a driverless car or a dispatching system, for example. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon, Intel Core, AMD Opteron and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to interact with a driverless car.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
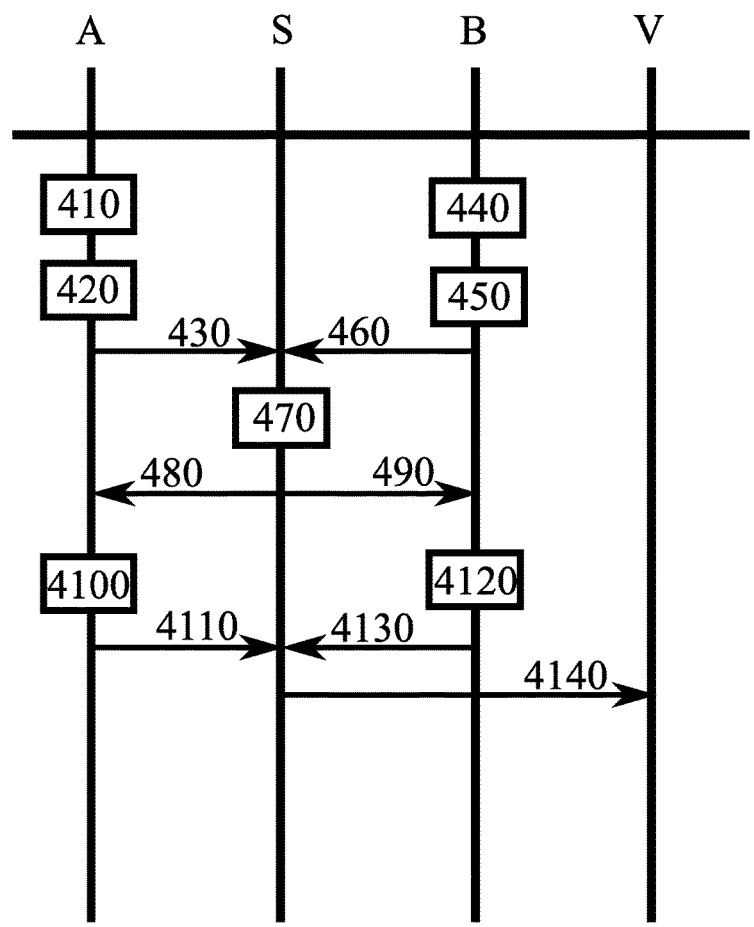
FIG. 4 illustrates signalling in accordance with at least some embodiments of the present invention.

FIG. 4 illustrates signalling in accordance with at least some embodiments of the present invention. On the vertical axes are disposed, from left to right, passenger A, driverless car dispatcher S, passenger B and, finally, driverless car V. In the figure, time advances from the top toward the bottom. By passenger A and passenger B it is herein actually meant a computer program of passenger A and passenger B, respectively. Such a computer program may be arranged to run on computing device of a passenger, such as a smartphone, for example.

In phase 410 passenger A compiles his preferred route, the preferred route consisting of a sequence of node identifiers $\{s_1, s_2, \ldots, s_n\}_A$. In phase 420, passenger A encrypts the nodes comprised in the preferred route, yielding a sequence of encrypted node identifiers $\{E(s_2), \ldots, E(s_{n-1})\}_A$ as described above. The initial point and end point may be excluded from the encrypted sequence of nodes in phase 420. In phase 430, passenger A provides the sequence of encrypted node identifiers to dispatcher S.

In phases 440, 450 and 460 passenger B compiles his preferred route, encrypts node identifiers comprised in his preferred route, and provides the sequence of encrypted node identifiers to dispatcher S. Phases 440, 450 and 460 on the passenger B side are analogous to phases 410, 420 and 430 on the passenger A side.

In phase 470, dispatcher S may determine potential passengers for a shared ride. This may take place based, at least in part, on a subscriber class, city or suburb-level location or other suitable metric, for example. In the example illustrated in FIG. 4, it is in this phase determined that passenger A and passenger B may potentially share a ride. As a response to the determination of phase 470, dispatcher S provides, in phase 480, to passenger A the encrypted series of nodes received from passenger B. Likewise, dispatcher S provides, in phase 490, to passenger B the encrypted series of nodes received from passenger A.

In general where a set of more than two passengers are determined as potentially sharing a ride, the encrypted node identifiers of each passenger in the set may be provided to each passenger comprised in the set. A exception may be each passenger's own route, which need not be informed from the dispatcher since the passengers already know their own preferred routes.

In phase 4100, passenger A performs a secure comparison between the encrypted node identifiers it received in phase 480 and the node identifiers comprised in the preferred route of passenger A. To perform the comparison, passenger A may derive a comparison token for each node identifier comprised in the preferred route of passenger A, and compare the comparison tokens to the encrypted node identifiers of passenger B. Passenger A may derive the comparison token by using a public key of passenger B on unencrypted node identifiers comprised in the preferred route of passenger A.

In phase 4110, dispatcher S is informed of route details derived by passenger A based on at least one node identifier that is determined in phase 4100 to be shared between the preferred route of passenger A and the preferred route of passenger B.

In phase 4120, passenger B performs a secure comparison between the encrypted node identifiers it received in phase 490 and the node identifiers comprised in the preferred route of passenger B. To perform the comparison, passenger B may derive a comparison token for each node identifier comprised in the preferred route of passenger B, and compare the comparison tokens to the encrypted node identifiers of passenger A. Passenger B may derive the comparison token by using a public key of passenger A on unencrypted node identifiers comprised in the preferred route of passenger B.

In phase 4130, dispatcher S is informed of route details derived by passenger B based on at least one node identifier that is determined in phase 4120 to be shared between the preferred route of passenger B and the preferred route of passenger A.

In phase 4140, driverless car V is informed of a route it is to traverse, enabling the route to be at least in part shared between passenger A and passenger B.

Figure 5:
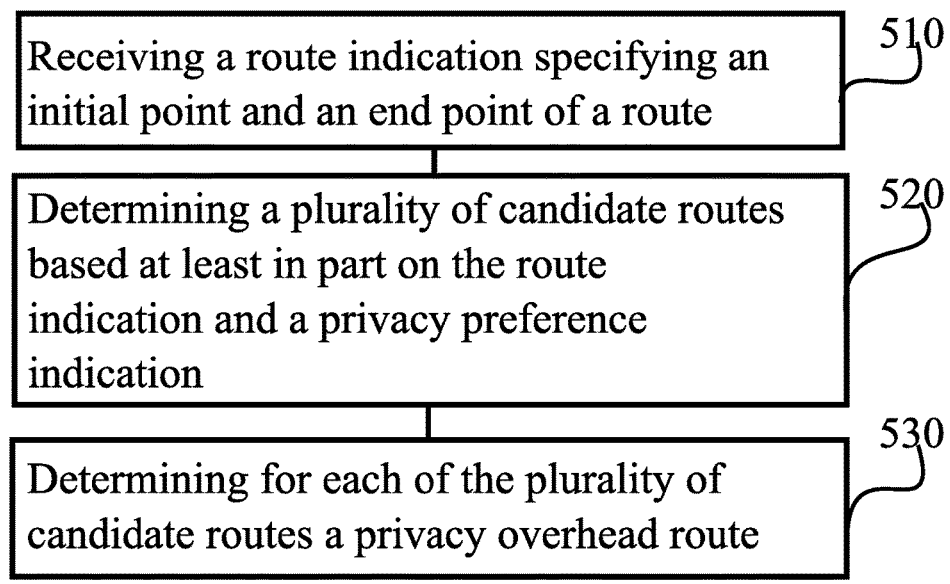
FIG. 5 is a first flow chart of a first method in accordance with at least some embodiments of the present invention.

FIG. 5 is a first flow chart of a first method in accordance with at least some embodiments of the present invention. The phases of the illustrated method may be performed in a passenger device, for example, or in a control device of a passenger device, or in a dispatcher device, for example.

Phase 510 comprises receiving a route indication specifying an initial point and an end point of a route. Phase 520 comprises determining a plurality of candidate routes based at least in part on the route indication and a privacy preference indication. Finally, phase 530 comprises determining for each of the plurality of candidate routes a privacy overhead route.

Figure 6:
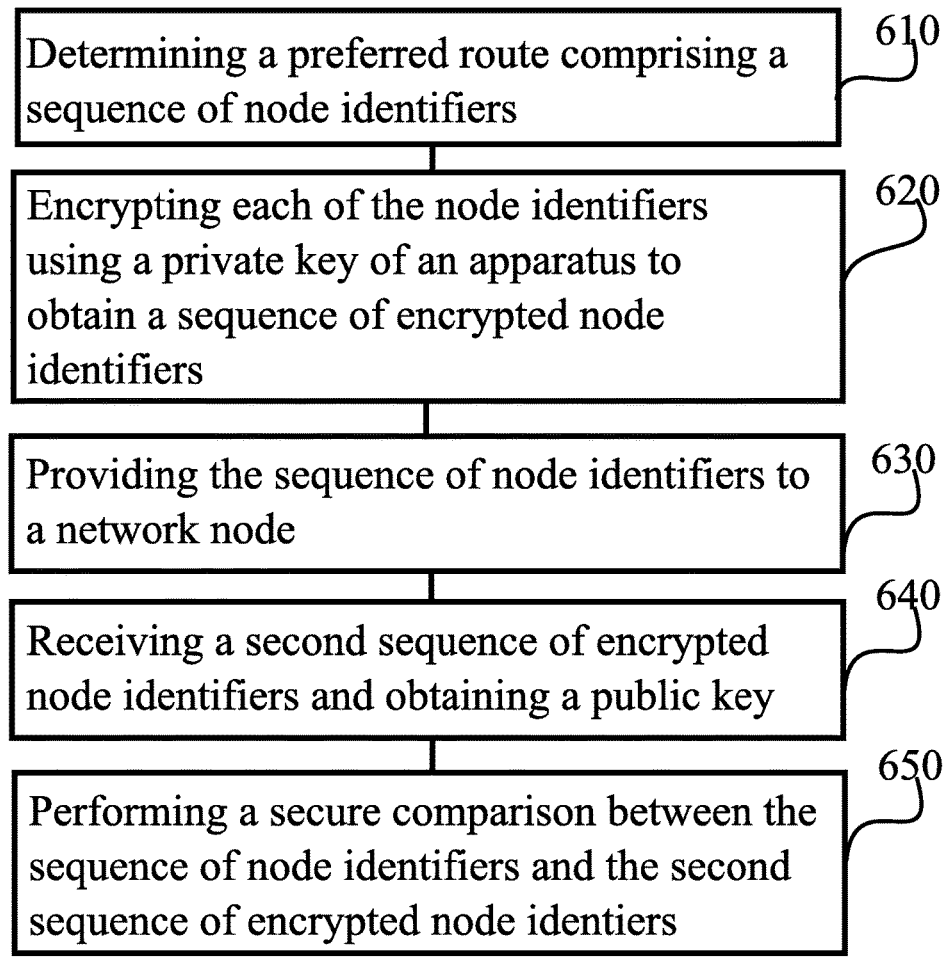
FIG. 6 is a second flow chart of a second method in accordance with at least some embodiments of the present invention.

FIG. 6 is a second flow chart of a second method in accordance with at least some embodiments of the present invention. The phases of the illustrated method may be performed in a passenger device, for example, or in a control device of a passenger device. Phase 610 comprises determining a preferred route comprising a sequence of node identifiers. Phase 620 comprises encrypting each of the node identifiers using a private key of an apparatus to obtain a sequence of encrypted node identifiers. Phase 630 comprises providing the sequence of encrypted node identifiers to a network node. Phase 640 comprises receiving a second sequence of encrypted node identifiers. Phase 640 may further comprise obtaining a public key, such as, for example, a public key associated with the second sequence of encrypted node identifiers. Finally, phase 650 comprises performing a secure comparison between the sequence of node identifiers and the second sequence of encrypted node identifiers. The method may comprise obtaining a public key associated with the second sequence of encrypted node identifiers. This obtaining may occur in connection with phase 640 or in connection with another phase, or even before phase 610.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   at least one receiver configured to receive a route indication specifying an initial point and an end point of a route, and
   at least one processing core configured to determine a plurality of candidate routes based at least in part on the route indication and a privacy preference indication, and to determine for each of the plurality of candidate routes a privacy overhead route connecting the end point of the route with an end of the candidate route.

2. The apparatus according to claim 1, wherein the at least one processing core is further configured to determine, for each privacy overhead route, at least one of an associated time overhead and an associated fuel consumption overhead.

3. The apparatus according to claim 1, wherein the at least one processing core is configured to determine the plurality of candidate routes by employing a graph traversal algorithm to identify routes that begin in the initial point specified in the route indication and satisfy the privacy preference indication.

4. The apparatus according to claim 1, wherein the privacy preference indication is associated with a minimum number of possible paths.

5. The apparatus according to claim 1, wherein the plurality of candidate routes comprises at least one first route that comprises the end point specified in the route indication such that the first route does not end at the end point.

6. The apparatus according to claim 5, wherein for each of the at least one first route, a route extending from the end point to the end of the first route comprises the privacy overhead route.

7. The apparatus according to claim 1, wherein the plurality of candidate routes comprises at least one second route that does not comprise the end point.

8. The apparatus according to claim 7, wherein for each of the at least one second route, a route extending from the end of the second route to the end point comprises the privacy overhead route.

9. The apparatus according to claim 1, wherein the at least one processing core is configured to determine the plurality of candidate routes at least in part in dependence of a maximum time parameter.

10. A method comprising:
   receiving a route indication specifying an initial point and an end point of a route;
   determining a plurality of candidate routes based at least in part on the route indication and a privacy preference indication, and
   determining for each of the plurality of candidate routes a privacy overhead route connecting the end point of the route with an end of the candidate route.

11. The method according to claim 10, further comprising determining, for each privacy overhead route, at least one of an associated time overhead and an associated fuel consumption overhead.

12. The method according to claim 10, wherein the plurality of candidate routes are determined by employing a graph traversal algorithm to identify routes that begin in the initial point specified in the route indication and satisfy the privacy preference indication.

13. The method according to claim 10, wherein the privacy preference indication is associated with a minimum number of possible paths.

14. The method according to claim 10, wherein the plurality of candidate routes comprises at least one first route that comprises the end point specified in the route indication such that the first route does not end at the end point.

15. The method according to claim 14, wherein for each of the at least one first route, a route extending from the end point to the end of the first route comprises the privacy overhead route.

16. The method according to claim 10, wherein the plurality of candidate routes comprises at least one second route that does not comprise the end point.

17. The method according to claim 16, wherein for each of the at least one second route, a route extending from the end of the second route to the end point comprises the privacy overhead route.

18. The method according to claim 10, wherein the plurality of candidate routes are determined at least in part in dependence of a maximum time parameter.

19. A non-transitory computer readable medium having stored thereon a set of computer readable instructions that, when executed by at least one processor, cause an apparatus to at least:
   receive a route indication specifying an initial point and an end point of a route,
   determine a plurality of candidate routes based at least in part on the route indication and a privacy preference indication, and
   determine for each of the plurality of candidate routes a privacy overhead route connecting the end point of the route with an end of the candidate route.

* * * * *